United States Patent [19]

Darigo et al.

[11] Patent Number: 5,797,271
[45] Date of Patent: Aug. 25, 1998

[54] MOBILE BRINE TANK QUICK-FREEZING SYSTEM AND METHOD

[75] Inventors: Robert Joseph Darigo, Huntingdon Valley, Pa.; Daniel Virgil Black, Milton, Fla.

[73] Assignee: Pelican Bait, Inc. Philadelphia, Pa.

[21] Appl. No.: 636,452

[22] Filed: Apr. 23, 1996

[51] Int. Cl.⁶ ............................ F25D 17/02
[52] U.S. Cl. ............... 62/64; 62/239; 62/375; 62/434
[58] Field of Search ............... 62/64, 239, 374, 62/375, 434, 435, 457.1, 457.9

[56] References Cited

U.S. PATENT DOCUMENTS

| | | | |
|---|---|---|---|
| 1,907,649 | 5/1933 | Marx | 62/374 |
| 2,909,040 | 10/1959 | Newell | 62/59 |
| 3,022,637 | 2/1962 | Morrison | 62/64 |
| 3,027,734 | 4/1962 | Mills | 62/375 |
| 3,216,215 | 11/1965 | Shuett | 62/435 |
| 3,802,214 | 4/1974 | Prieto | 62/240 |
| 3,888,092 | 6/1975 | Fisher | 62/457.9 |
| 4,301,097 | 11/1981 | Curtis | 261/109 |
| 4,302,944 | 12/1981 | Gainer | 62/434 |
| 4,406,131 | 9/1983 | Weasel, Jr. | 62/64 |
| 4,434,623 | 3/1984 | Weasel, Jr. | 62/64 |
| 4,555,908 | 12/1985 | Peterson | 62/64 |
| 4,577,466 | 3/1986 | Cunningham | 62/63 |

*Primary Examiner*—William E. Tapolcai
*Attorney, Agent, or Firm*—Panitch Schwarze Jacobs & Nadel, P.C.

[57] ABSTRACT

A mobile system for quick-freezing seafood is provided. The mobile system includes a vehicle having a tank for containing a liquid coolant, with a seafood inlet in fluid communication with the tank. A liquid coolant distribution header is located in the tank and adapted for connection to a mobile chilled liquid coolant source. A liquid coolant outlet port is provided in fluid communication with the tank. A frozen seafood removal device is located in the tank and is adapted to remove quick-frozen seafood from the liquid coolant in the tank.

9 Claims, 3 Drawing Sheets

5,797,271

1

MOBILE BRINE TANK QUICK-FREEZING SYSTEM AND METHOD

FIELD OF THE INVENTION

The present invention relates to a land-based AGE Mobile system for quick-freezing food products, and more particularly to a brine tank freezing system mounted on a vehicle which can easily moved to different dock sites for quick-freezing fresh seafood as it is off loaded from fishing vessels.

BACKGROUND OF THE INVENTION

In commercial fishing operations, it is important that fish be frozen as soon as possible after being caught in order to prevent spoilage which starts rapidly in seafood. In large-scale fishing operations where ships are at sea for several weeks between docking, the seafood catch is often placed in a brine tank system located in the hull of the fishing vessel which kills and freezes the catch using chilled brine at 5° F. to 12° F. The chilled brine is sprayed through the nozzles into one or more tanks in the hull to freeze the fresh fish as they are loaded into the tanks, and the chilled brine is recirculated through the tanks to deep freeze the fish. The tanks are then drained and kept in a refrigerated state for dry preservation of the fish during extended cruises to avoid the risk of salting by osmosis. At the dock, the frozen fish are unloaded by flooding the tanks to float the frozen fish out for further processing or shipping.

Large ships with brine tank chillers are usually limited to specific fish for which there is a large demand, such as squid, herring, mackerel and tuna, because a typical hold can accommodate 400,000 pounds or more of fish. Since different species are not mixed within the same hold, species of fish that are not as plentiful or for which there is less demand are wasted.

While this system has proven effective for large scale fishing operations, small fishing boats, which are generally at sea for one to three days between docking, are still required to pack their catch in ice or to place the seafood catch in small tanks of refrigerated sea water which cools the catch to approximately 35° F. This type of storage such as packing the fish in ice or temporarily storing the fish in a tank with refrigerated sea water is acceptable for short time periods, but is not suitable for preventing long term deterioration and spoilage during subsequent handling. Preferably, the fish should be deep-frozen to between 5° F. and 120° F. which provides better preservation of the seafood and easier handling.

However, because of the size and cost of a brine tank chiller system, it is generally not feasible, due to space and economic considerations, for a small fishing vessel to include a brine tank chiller system for the small volume of seafood being handled. As a result, seafood from smaller fishing vessels is generally not as well preserved as the seafood from larger vessels which is quick frozen in a brine tank system, and the catch from smaller vessels is more prone to spoilage. This problem is exacerbated during subsequent handling and shipping until the fish reach a processing plant.

Some larger vessels also do not have deep freezing capabilities, and count on processors located at the docks to deep-freeze the catch when they return. When several vessels return with large catches, the dock side processors do not have the capacity to handle the volume of fish being brought in, resulting in a portion of the catch being wasted.

The present invention is a result of observation of the above limitations, and a desire to provide small fishing

2 vessels with an economic means for better preservation of their catch during subsequent shipping and handling, and to provide on-demand excess freezing capacity at docks when the volume of fish brought in exceeds the fixed freezing capacity of the processors located at the docks.

SUMMARY OF THE INVENTION

Briefly stated, the present invention is a mobile system for quick-freezing fresh food. The system comprises a vehicle having a tank for containing a liquid coolant, with a food inlet in fluid communication with the tank. A liquid coolant distribution header is located in the tank and is adapted for connection to a mobile liquid coolant source. A liquid coolant outlet port is provided in fluid communication with the tank. A frozen food removal device is located in the tank and is adapted to remove quick-frozen food from the liquid coolant in the tank.

In another aspect, the present invention provides a method for quick-freezing seafood. The method comprises the steps of:

(a) providing a mobile quick-freezing system for quick-freezing seafood including a trailer having a tank for containing liquid coolant, a seafood inlet in fluid communication with the tank, a liquid coolant distribution header located in the tank and adapted for connection to a liquid coolant source, a liquid coolant outlet port in fluid communication with the tank and a frozen seafood removal device located in the tank adapted to remove quick-frozen seafood from the liquid coolant in the tank;

(b) transporting the mobile quick-freezing system to a desired location;

(c) connecting a chilled liquid coolant source to the liquid coolant distribution header;

(d) spraying chilled liquid coolant into the tank;

(e) introducing seafood into the tank through the seafood inlet;

(f) quick-freezing the seafood with the chilled liquid coolant spray; and (g) removing the frozen seafood from the tank.

BRIEF DESCRIPTION OF THE DRAWINGS foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENT

Certain terminology is used in the following description for convenience only and is not limiting. The words "right," "left," "lower" and "upper" designate directions in the

3 drawings to which reference is made. The words "inwardly" and "outwardly" refer to directions toward and away from, respectively, the geometric center of the mobile brine-tank quick freezing system and designated parts thereof. The terminology includes the words above specifically mentioned, derivatives thereof and words of similar import.

Figure 1:
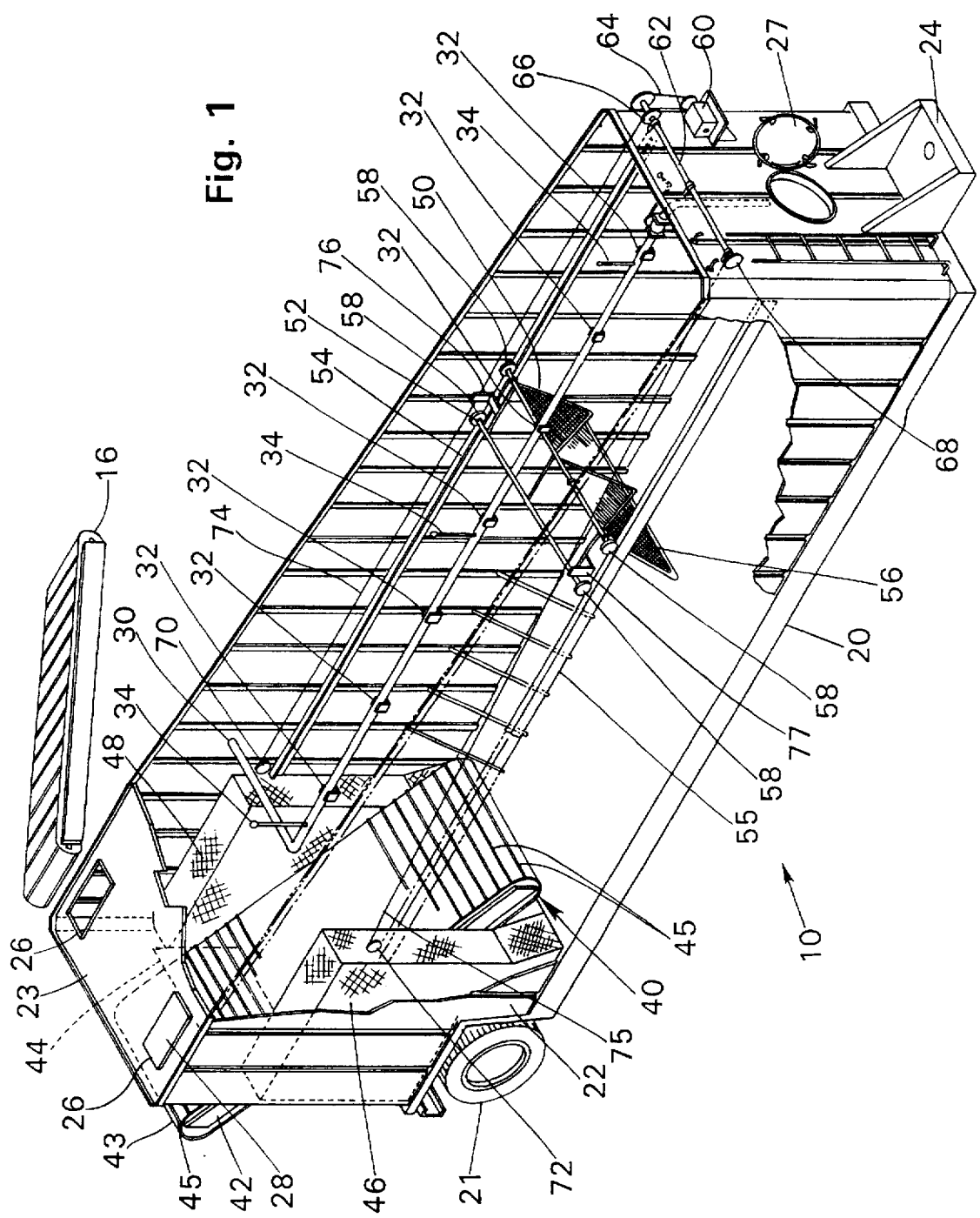
FIG. 1 is a perspective view, partially broken away, of a mobile liquid coolant system in accordance with the present invention.
Figure 2:
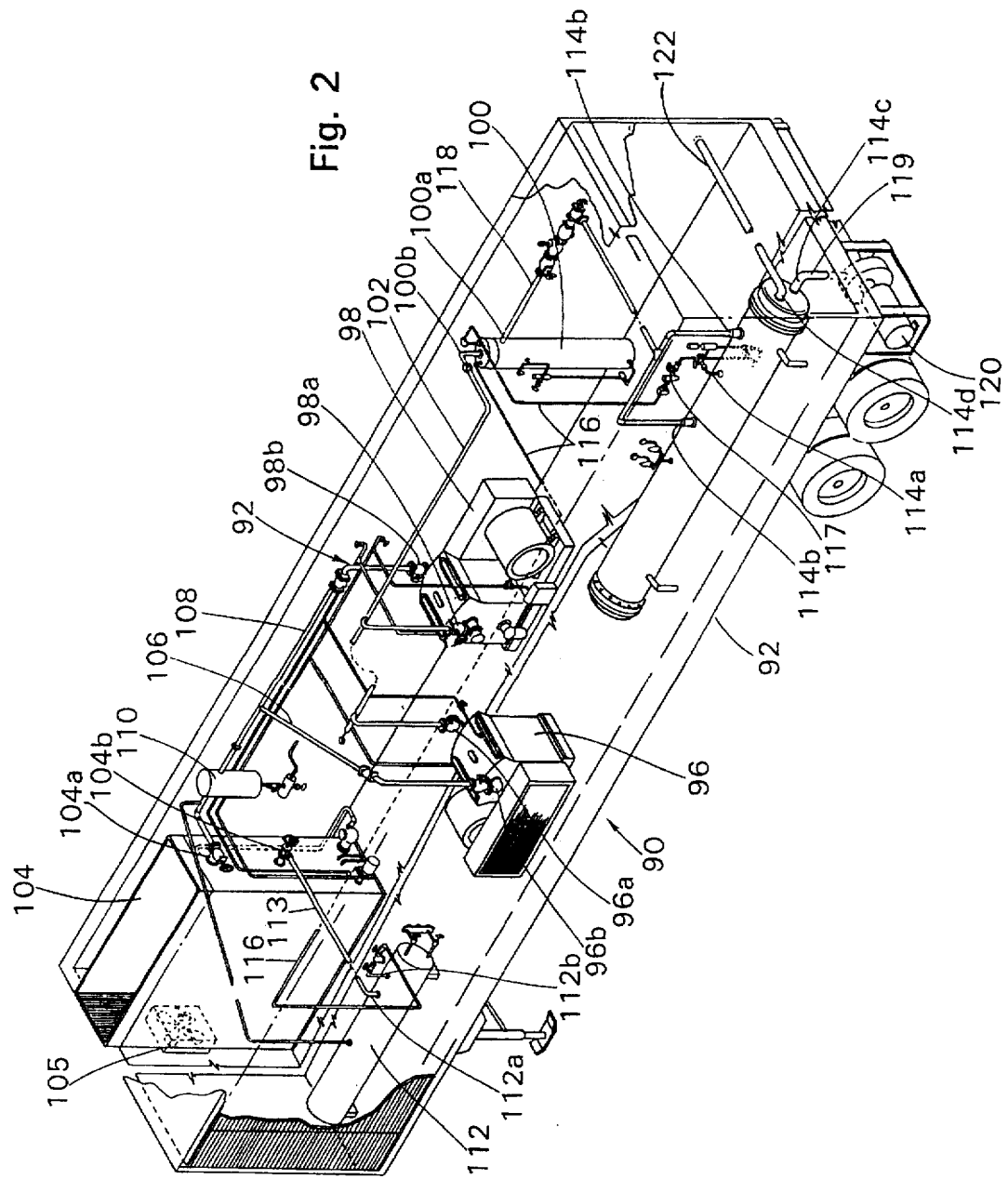
FIG. 2 is a perspective view, partially broken away, of a mobile chilled liquid coolant source.
Figure 3:
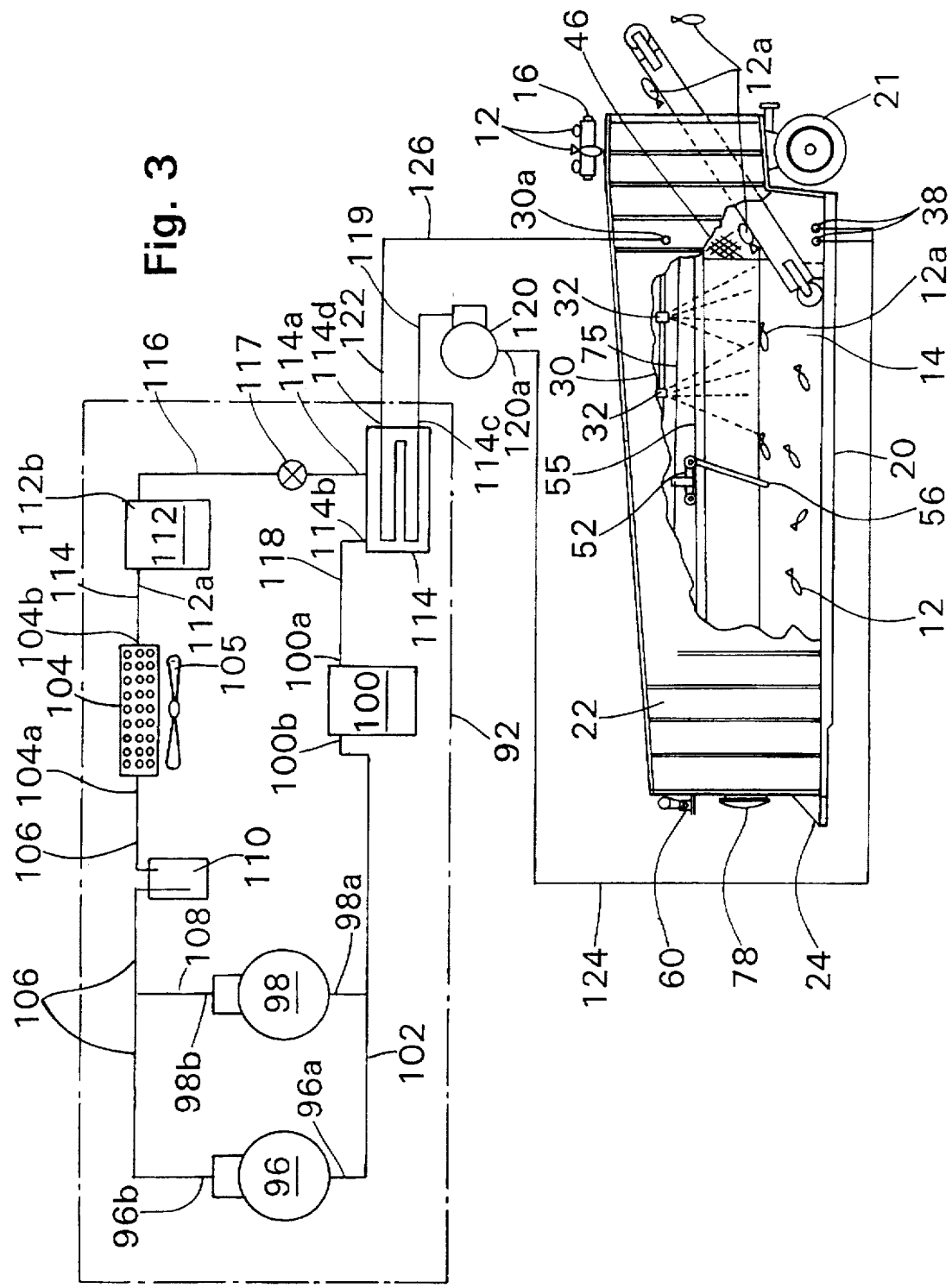
FIG. 3 is a schematic diagram showing the operation of the mobile quick-freezing system in accordance with the present invention.

Referring to the drawings, wherein like numerals indicate like elements throughout, there is shown in FIGS. 1–3 a mobile system 10 for a quick-freezing food, such as fresh seafood or fish 12, in accordance with the present invention.

Referring now to FIG. 1, the mobile system 10 includes a vehicle, preferably in the form of a trailer 20, having a tank 22 for containing a liquid coolant 14 (shown in FIG. 3). In the preferred embodiment, the liquid coolant 14 is a brine solution, with the concentration of salt in the solution being such that the brine can be cooled to a temperature of between approximately 5° F. and 12° F. while still remaining liquid. In the preferred embodiment, a sodium chloride brine which is mixed from a distressed flour salt is used.

In the preferred embodiment, the brine tank trailer 20 is approximately 35-feet long and the tank 22 is rectilinear in shape and has a capacity of about 21,000 gallons. Approximately 4000–5000 gallons of liquid coolant 14 is provided in the tank 22. The trailer 20 includes wheels 21 located at the back end thereof and a hitch 24 adapted for connection to a tractor or truck (not shown) located at the front end. It will be understood by those skilled in the art that the type of tank trailer 20 utilized could be varied, and a standard tank truck trailer which is generally cylindrical in shape could be used, if desired, and the shape of the tank 22 on the trailer 20 can be varied to suit particular needs. It will also be understood that the tank 22 could be a separate tank mounted directly onto a truck bed.

The trailer 22 includes a seafood inlet 26 located on the top 23 of the tank 22 and in fluid communication with the tank 22. Preferably, two or more seafood inlets 26 are provided on the top 23 of the tank 22. Covers 28 are provided for the seafood inlets 26 when the tank 22 is not in use. Preferably, an auxiliary conveyor 16 is used in conjunction with loading the seafood 12 into the tank 22 through the inlets 26. It will be understood by those skilled in the art that additional seafood inlets can be provided in the sides of the tank 22 if desired, and the access hatch 27 located at the front of the tank 22 or other openings (not shown) may also be used for loading seafood.

A liquid coolant distribution header 30 is located in the tank 22 and adapted for connection to a mobile chilled liquid coolant source 90, described in detail below. Preferably, the liquid coolant distribution header 30 is in fluid communication with a plurality of spray nozzles 32 located in the tank and spaced along the distribution header 30. The distribution header 30 is preferably suspended from the top 23 of the tank 22 by hangers 34 or other suitable suspension means. A liquid coolant outlet port 38, and preferably two liquid coolant outlet ports 38, are provided in fluid communication with the tank 22, as shown in FIG. 3.

Referring now to FIGS. 1 and 3, a frozen seafood removal device 40 is located in the tank 22 and is adapted to remove quick-frozen seafood from the liquid coolant 14 in the tank 22. Preferably the frozen seafood removal device 40 comprises a conveyor 42 mounted inside the tank and in communication with a frozen seafood outlet opening 44 in the tank 22. The conveyor 42 includes a moving belt 43 which extends upwardly and outwardly through the outlet opening 44. Preferably, the moving belt 43 includes ridges 45 so that the quick-frozen seafood does not slip from the belt 43 as it is being removed.

4

Located on each side of the conveyor 42 are filter boxes 46 and 48. The filter boxes are comprised of at least one layer of a filter material and are located between the main portion of the tank 22 and the outlet ports 38. Preferably one outlet port 38 is connected to an area enclosed within the first filter box 46 and the second outlet port 38 is connected to an area enclosed within the second filter box 48. In the preferred embodiment each filter box includes two layers of mesh material spaced approximately four to five inches apart. The openings in the layers of mesh are approximately ¼ to ¹⁄₁₆ inch, which prevents most loose scales or other loose material from entering the outlet ports 38. Preferably the mesh is made of stainless steel or a hydrolysis resistant polymeric material. However, it will be understood by those skilled in the art that any suitable filter material, such as a water permeable nonwoven mat, may be used.

Still with reference FIG. 1, the removal device 40 further includes a quick-frozen seafood collection device 50. The collection device 50 comprises a trolley 52 mounted for longitudinal movement in the tank 22 on two tracks 54, 55. The tracks 54, 55 are mounted along the longitudinal sides of the tank 22. The trolley 52 further includes rollers 58 which travel on the tracks 54 and 55. A drag screen 56 is supported by the trolley 52 and extends into the liquid coolant 14 approximately six inches to one foot, as shown in FIG. 3. The trolley 52 is preferably driven by a motor 60 mounted outside the tank 22. The motor is drivingly connected to a drive shaft 62 by a belt 64. Two drive pulleys 66, 68 are located on opposite ends of the drive shaft 62, each drive pulley being located in proximity to an end of one of the tracks 54, 55. Idler pulleys 70 and 72 are located in the tank 22 at the opposite end of the tracks 54 and 55 from the drive shaft 62. Continuous drive cables 74, 75 extend between the drive pulleys 66, 68 and the idler pulleys 70, 72, respectively. The drive cables 74 and 75 are connected to brackets 76, 77 on each side of the trolley 52 such that the motor 60 can be used to move the trolley 52 back and forth along the tracks 54, 55 inside the tank 22. Movement of the trolley 56 results in corresponding movement of the drag screen 56 for moving frozen seafood in the tank 22 toward the seafood removal device 40.

Referring now to FIGS. 2 and 3, the mobile system 10 for quick-freezing seafood 12 further includes a mobile chilled liquid coolant source 90 which is connected to the liquid coolant distribution header 30 on the tank 22 for providing chilled liquid coolant 14 to the tank 22. Preferably, the mobile chilled liquid coolant source 90 is a refrigeration system 92 having a heat exchanger/chiller 114, described in detail below, located on a second vehicle, which is preferably a trailer 94, but could also be a truck or other vehicle.

As shown in FIGS. 2 and 3, the refrigeration system 92 preferably comprises first and second compressors 96 and 98 each having a compressor inlet 96a, 98a and a compressor outlet 96b, 98b. The compressors 96 and 98 are connected in parallel, with the compressor inlets 96a and 98a being fluidly connected to the outlet 100b of an accumulator 100 by a first pipe 102 and the compressor outlets 96b and 98b being fluidly connected to the inlet 104a of a condenser 104 by second and third pipes 106 and 108. Preferably, an oil separator 110 is located along the second pipe 106. The condenser 104 is preferably in fluid communication with a receiver 112 via a fourth pipe 113 connected between the condenser outlet 104b and the receiver inlet 112a. A fan 105 is provided for directing an air flow over the coils of the condenser 104. The receiver 112 includes an outlet 112b which is in fluid communication with the inlet 114a of a chiller/heat exchanger 114 via a fifth pipe 116. An expansion valve 117 is located along the fifth pipe 116. Preferably, the fifth pipe 116 passes through the accumulator 100 to provide additional heat for vaporizing refrigerant in the accumulator 100 before it is drawn into the first and second compressors 96, 98. It will be understood by the skilled artisan that the refrigeration system 92 as described can operate on the first or second compressor 96, 98 or both, depending upon the load on the system.

The chiller/heat exchanger 114 is preferably a tube-in-shell heat exchanger with two separate fluid paths, with the refrigerant being circulated through the outer shell and the liquid coolant being pumped through the tubes which pass through the shell. Preferably, the chiller/heat exchanger 114 has two outlets 114b which are in fluid communication with the inlet 100a of the accumulator 100 via a sixth pipe 118. Preferably, the chiller/heat exchanger 114 has a liquid coolant inlet 114c and a liquid coolant outlet 114d.

In the preferred embodiment, the refrigeration system 92 utilizes an ammonia as a refrigerant, and operates in a manner known to those skilled in the art. However, the type of refrigeration system and/or refrigerant used, and the specific type and layout of the components of the refrigeration system 22 may be varied, if desired, depending on the specific application.

As shown in FIG. 3, the liquid coolant inlet 114c is preferably connected to one or more outlet ports 38 in the tank 22 via a first detachable hose 124 which is connected to a liquid coolant pump 120 located on the refrigeration trailer 94. A seventh pipe 119 is fluidly connected between the liquid coolant pump 120 and the liquid coolant inlet 114c of the chiller/heat exchanger 114. The chiller/heat exchanger outlet 114d is in fluid connection with the liquid coolant distribution header 30 via an eighth pipe 122 which is connected to a second detachable hose 126.

Having described the elements of the mobile system 10 for quick-freezing seafood 12, a brief description of its operation follows with respect to FIG. 3. The mobile quick-freezing system 10 is transported to a desired location, such as a dock where small vessels unload their catch of seafood. Preferably, the liquid coolant tank trailer 20 and the refrigeration unit trailer 94 are transported to the desired location by towing the trailers 20 and 94 with appropriate tractors or trucks. Once in position, the chilled liquid coolant source 90 is connected to the liquid coolant distribution header 30 on the tank 22, preferably by connecting the first detachable, flexible hose 124 between the liquid coolant pump 120 and the liquid coolant outlet(s) 38 on the tank 22, and connecting the second detachable, flexible hose 126 between the inlet 30a of the liquid coolant distribution header 30 and the pipe 122 extending from the outlet 114d of the chiller/heat exchanger 114.

Chilled liquid coolant 14 is sprayed into the tank 22 through the distribution header 30 and the spray nozzles 32, and liquid coolant 14 is simultaneously drawn from the tank by the liquid coolant pump 120 through the first flexible, detachable hose 124 from the outlet port 38 on the tank 22. The liquid coolant 14 is circulated through the tubes in the chiller/heat exchanger 114 to cool the liquid coolant 14 with the refrigerant circulating through the outer shell of the chiller/heat exchanger 114 of the refrigeration system 92.

The refrigeration system 92 is operated by providing power to the first and/or second compressors 96, 98 which draw low pressure refrigerant, such as ammonia, in a vapor state from the accumulator 100. Either one or both compressors 96, 98 can be operated depending on the cooling load on the system. The compressors 96, 98 compress the low temperature, low pressure refrigerant to a high pressure, high temperature state. The high pressure, high temperature refrigerant is directed via the second pipe 106 through an oil separator 110 where oil is removed from the refrigerant while the refrigerant is still in a vaporized state. The vaporized refrigerant is passed through the condenser 104 where it is cooled by an air flow generated by the fan 105 and condensed. The condensed high pressure, high temperature refrigerant is passed through the condenser outlet 104b and the fourth pipe 113 into the inlet 112a of the receiver 112. The condensed high pressure, high temperature liquid refrigerant is passed through the receiver outlet 112b and the fifth pipe 116 to the expansion valve 117 which allows the refrigerant to expand and cool as its transitions from a high pressure, high temperature state to a low pressure, lower temperature state. The expanded refrigerant enters the chiller/heat exchanger 114 through the chiller/heat exchanger inlet 114a. The refrigerant absorbs heat from the liquid coolant 14 being circulated through tubes in the chiller/receiver 114 which vaporizes the refrigerant. The refrigerant exits the chiller/receiver 114 through the chiller outlet 114b and is passed through the sixth pipe 118 to the accumulator 100, where low pressure vaporized refrigerant is drawn via the first pipe 102 to the compressor inlets 96a, 98a.

When small vessels arrive at the dock, their catch of seafood, such as fish 12, is fed into the tank 22 via the auxiliary conveyor 16. As the seafood 12 enters the tank 22, it is sprayed with chilled liquid coolant at 5° F. to 12° F., preferably a brine solution, to quick freeze the fish. The fresh fish settle to the bottom of the tank 22 in the chilled liquid coolant where their temperature is quickly lowered to between 50° F. and 12° F. As the seafood 12 freezes, it floats to the top of the liquid coolant 14 in the tank 22.

The conveyor 42 for removing the frozen seafood is turned on such that the moving belt 43 will carry the frozen fish 12 through the seafood outlet opening 44 where it is picked up for further shipping or cold storage. In order to direct the frozen fish 12a floating on the surface of the liquid coolant 14 toward the seafood removal conveyor 42, the trolley 52 is first moved to the front end of the tank 22 via the motor 60 turning the drive shaft 62, which in turn drives the first and second drive pulleys 66 and 68 to move the drive cables 74, 75 which are attached to the brackets 76, 77 on either side of the trolley 52. The trolley 52 is moved forward along the tracks 54, 55 until it reaches the front of the tank 22. The direction of the motor 60 is then reversed and the drag screen 56, which is angled downward and toward the back of the tank directs the frozen fish on top of the liquid coolant within the tank 22 toward the conveyor 42 as the trolley 52 is moved in the reverse direction toward the back end of the tank 22. The quick-frozen fish 12a floating on top of the liquid coolant 12 are carried out of the tank 22 by the conveyor 42.

Once the operation at a given dock is completed, the entire mobile system 10, including the tank trailer 20 and the refrigeration trailer 94 can be moved to the next dock for processing incoming seafood from additional vessels. This allows the mobile system 10 of the present invention to be utilized for several smaller fishing vessels at different docks, reducing the capital equipment cost required in comparison to outfitting each smaller vessel with a brine tank quick-freezing system and the necessary liquid coolant refrigeration system.

In certain docks which cannot accommodate the tank trailer 22 and the refrigeration trailer 94, the seafood may be unloaded into a smaller tank truck (not shown) and driven to a location near the dock where there is adequate room for the tank trailer 20 and refrigeration trailer 94. The fish can be unloaded directly from the tank truck into the liquid coolant tank 22 through the access hatch 27 in the front of the tank 22. If the fish are being transported in seawater, they can be directed through a dewatering box (not shown) and the hatch 27 on the liquid coolant tank 22 of the present invention. The dewatering box is of the type known to those skilled in the art, and is required in order to keep the seawater from diluting the liquid coolant, which is preferably a brine solution, utilized in the mobile quick-freezing system 10 of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A mobile system for quick-freezing fresh unpackaged food, comprising:

a tank for containing a liquid coolant attached to one of a truck and a trailer for transport over land;

a food inlet in fluid communication with the tank;

a liquid coolant distribution header located in the tank and adapted for connection to a mobile liquid coolant source;

a liquid coolant outlet port in fluid communication with the tank;

a frozen food removal device located in the tank adapted to remove quick-frozen food from the liquid coolant in the tank; and a mobile liquid coolant source having the capacity to cool the liquid coolant located in the tank, the mobile liquid coolant source being attached to one of a second truck and a second trailer for transport over land, the mobile liquid coolant source being adapted to be connected to the liquid coolant distribution header on the tank for providing chilled liquid coolant.

2. The system of claim 1 wherein the liquid coolant distribution header is in fluid communication with a plurality of spray heads located in the tank.

3. The system of claim 1 further comprising a seafood distribution device located in the tank.

4. The system of claim 3 wherein the seafood distribution device comprises a trolley mounted for longitudinal movement in the tank, and a drag screen supported by the trolley.

5. The system of claim 1 wherein the frozen food removal device is a conveyor mounted inside the tank in communication with a frozen food outlet opening in the tank.

6. A mobile system for quick-freezing seafood, comprising:

a tank for containing at least 4000 gallons of liquid coolant attached to one a truck and trailer for transport over land;

a seafood inlet in fluid communication with the tank through at least one opening in the tank;

a liquid coolant distribution header located in the tank and adapted for connection to a liquid coolant source, the distribution header being in fluid communication with a plurality of spray heads located in the tank;

a liquid coolant outlet port in fluid communication with the tank;

a conveyor adapted to remove frozen seafood from the tank located in communication with the tank;

a mobile chilled liquid coolant source having the capacity to cool the at least 4000 gallons of liquid coolant located in the tank to at least approximately 12° F., the mobile liquid coolant source being attached to one of a second truck and a second trailer, the mobile liquid coolant source being adapted to be connected to the liquid coolant distribution header on the tank for providing chilled brine, such that the liquid coolant tank and the mobile chilled liquid coolant source can be moved overland from dock to dock to quick freeze fresh seafood.

7. A method for quick-freezing seafood comprising:

(a) providing a mobile quick-freezing system for quick-freezing seafood including a tank for containing liquid coolant attach ed to one of a truck and a trailer, a seafood inlet in fluid communication with the tank, a liquid coolant distribution header located in the tank adapted for connection to a liquid coolant source, a liquid coolant outlet port in fluid communication with the tank and a frozen seafood removal device located in the tank adapted to remove quick-frozen seafood from the liquid coolant in the tank;

(b) transporting the mobile quick-freezing system over land to a desired location;

(c) connecting a mobile chilled liquid coolant source to the liquid coolant distribution header, the mobile chilled liquid coolant source being attached to one of a second truck and a second trailer for transport over land;

(d) spraying chilled liquid coolant into the tank;

(e) introducing seafood into the tank through the seafood inlet;

(f) quick-freezing the seafood with the chilled liquid coolant spray;

(g) removing the frozen seafood from the tank; and (h) moving the tank and the mobile chilled liquid coolant source over land to a next location for quick-freezing fresh seafood.

8. A mobile system for quick-freezing fresh unpackaged food, comprising:

a tank for containing a liquid coolant attached to one of a truck and a trailer for transport over land;

a food inlet in fluid communication with the tank;

a liquid coolant distribution header located in the tank and adapted for connection to a mobile liquid coolant source;

a liquid coolant outlet port in fluid communication with the tank;

a frozen food removal device located in the tank adapted to remove quick-frozen food from the liquid coolant in the tank; and a seafood distribution device located in the tank.

9. The system of claim 8 wherein the seafood distribution device comprises a trolley mounted for longitudinal movement in the tank, and a drag screen supported by the trolley.

* * * * *